United States Patent
Zami et al.

(10) Patent No.: US 9,178,612 B2
(45) Date of Patent: Nov. 3, 2015

(54) METHOD AND EQUIPMENT FOR OPERATING A COHERENT OPTICAL PACKET RECEIVER

(75) Inventors: Thierry Zami, Nozay (FR); Massimiliano Salsi, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 200 days.

(21) Appl. No.: 13/265,985

(22) PCT Filed: Mar. 3, 2010

(86) PCT No.: PCT/EP2010/052691
§ 371 (c)(1), (2), (4) Date: Nov. 28, 2011

(87) PCT Pub. No.: WO2010/127886
PCT Pub. Date: Nov. 11, 2010

(65) Prior Publication Data
US 2012/0099860 A1    Apr. 26, 2012

(30) Foreign Application Priority Data
May 5, 2009 (EP) .................... 09290325

(51) Int. Cl.
| | |
|---|---|
| H04J 14/00 | (2006.01) |
| H04B 10/077 | (2013.01) |
| H04B 10/079 | (2013.01) |
| H04B 10/2513 | (2013.01) |
| H04B 10/2507 | (2013.01) |
| H04J 14/02 | (2006.01) |

(52) U.S. Cl.
CPC ........ *H04B 10/0773* (2013.01); *H04B 10/0775* (2013.01); *H04B 10/0793* (2013.01); *H04B 10/07951* (2013.01); *H04B 10/2513* (2013.01); *H04B 10/2572* (2013.01); *H04J 14/0258* (2013.01); *H04J 14/0269* (2013.01); *H04J 14/0275* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,320,687 | B1 * | 11/2001 | Ishikawa | 398/147 |
| 6,498,886 | B1 | 12/2002 | Sobiski et al. | |
| 6,954,590 | B2 * | 10/2005 | Kandpal et al. | 398/31 |
| 2004/0047636 | A1 * | 3/2004 | Guild et al. | 398/147 |

(Continued)

FOREIGN PATENT DOCUMENTS

| | | |
|---|---|---|
| EP | 1422845 | 5/2004 |
| EP | 1942590 | 7/2008 |

OTHER PUBLICATIONS

Tao Liu, Hua Zhang, Jie Zhang, Wanyi Gu; A Novel Scheme of Adaptive Dispersion Compensation in Transparent Optical Networks; SPIE, Bellingham, WA, USA; 2007; XP040248614.

*Primary Examiner* — Shi K Li
*Assistant Examiner* — Mina Shalaby
(74) *Attorney, Agent, or Firm* — Patti & Malvone Law Group, LLC (57) ABSTRACT

The present invention refers to a method for operating a coherent optical packet receiver comprising at least one linear physical impairment compensation filter wherein the settings of at least one linear physical impairment compensation filter applied on a received optical packet having at least one given travelling parameter are determined in function of previous settings determination of said at least one linear physical impairment compensation filter achieved on at least one optical packet having a similar at least one travelling parameter as said received optical packet.

20 Claims, 5 Drawing Sheets

| | lightpath | residual chromatic dispersion parameter values | | | |
|---|---|---|---|---|---|
| connection ID | | parameter 1 | parameter 2 | parameter 3 | parameter 4 |
| LSP1 | N1-N3-N6 | 0,1233 | 2,58 | 12,32 | 2,5 |
| LSP2 | N12-N6 | 0,25 | 3,29 | 20,13 | 2,54 |
| LSP3 | N22-N15-N6 | 0,08 | 5,12 | 14,2 | 2,51 |
| LSP4 | N5-N6 | 0,15 | 2,24 | 15,31 | 2,48 |

(56) References Cited

U.S. PATENT DOCUMENTS

| | | | |
|---|---|---|---|
| 2005/0226613 A1* | 10/2005 | Raddatz | 398/27 |
| 2006/0120279 A1* | 6/2006 | Mitsumori | 370/218 |
| 2011/0064421 A1* | 3/2011 | Zhang et al. | 398/208 |
| 2011/0182194 A1* | 7/2011 | Jacquet et al. | 370/252 |

* cited by examiner

| connection ID | lightpath | residual chromatic dispersion parameter values | | | |
|---|---|---|---|---|---|
| | | parameter 1 | parameter 2 | parameter 3 | parameter 4 |
| LSP1 | N1-N3-N6 | 0,1233 | 2,58 | 12,32 | 2,5 |
| LSP2 | N12-N6 | 0,25 | 3,29 | 20,13 | 2,54 |
| LSP3 | N22-N15-N6 | 0,08 | 5,12 | 14,2 | 2,51 |
| LSP4 | N5-N6 | 0,15 | 2,24 | 15,31 | 2,48 |

METHOD AND EQUIPMENT FOR OPERATING A COHERENT OPTICAL PACKET RECEIVER

BACKGROUND OF THE INVENTION

The present invention relates to the field of optical systems and more particularly to coherent optical packet detectors.

Recent improvements in the wavelength division multiplexing (WDM) optical networks have led to transmission data rate up to 100 Gb/s per channel.

Thus, a transparent network provides huge capacity to transmit data from an ingress to an egress node.

Figure 1:
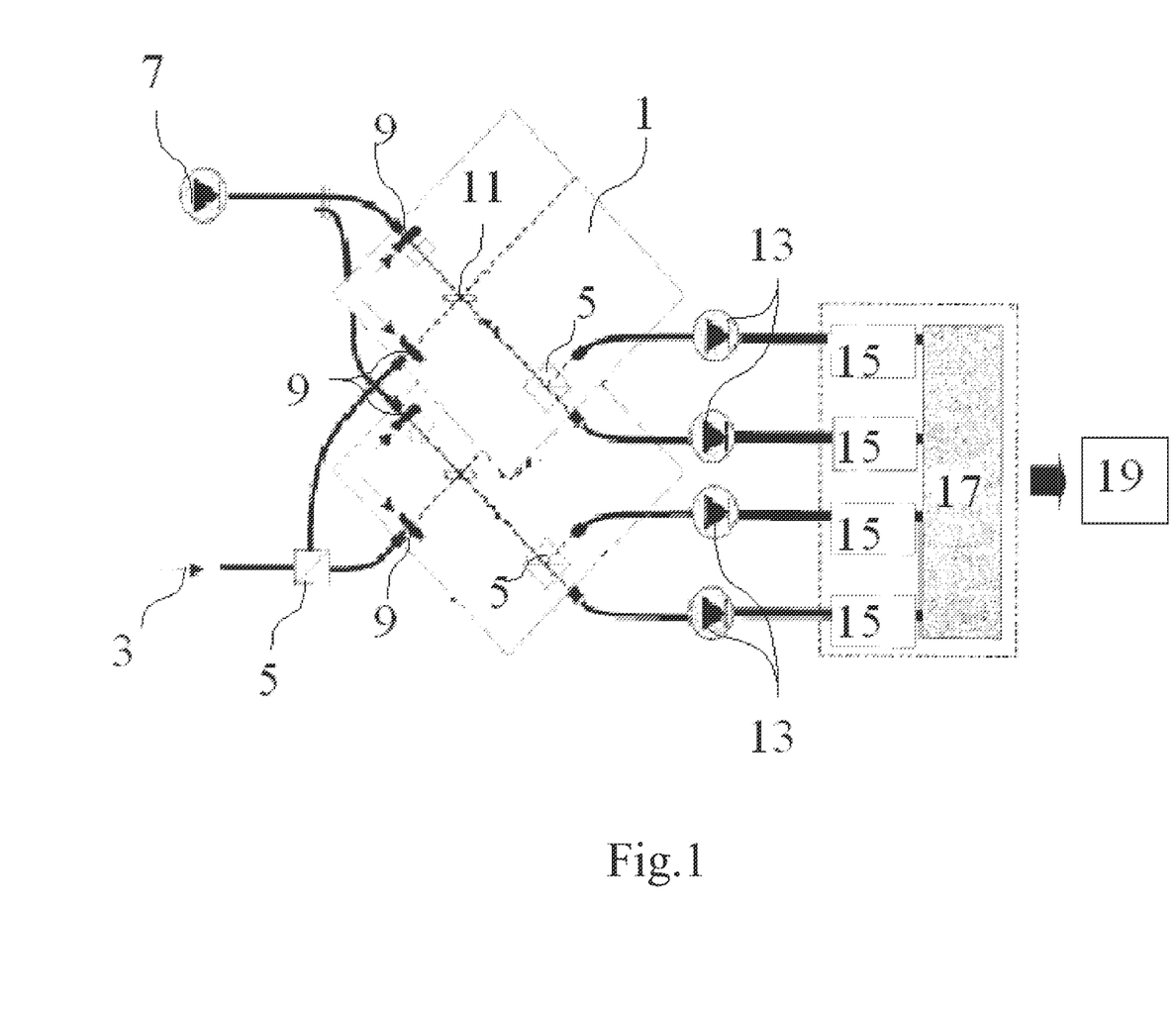
FIG. 1 is a diagram representing a coherent receiver.
Figure 2:
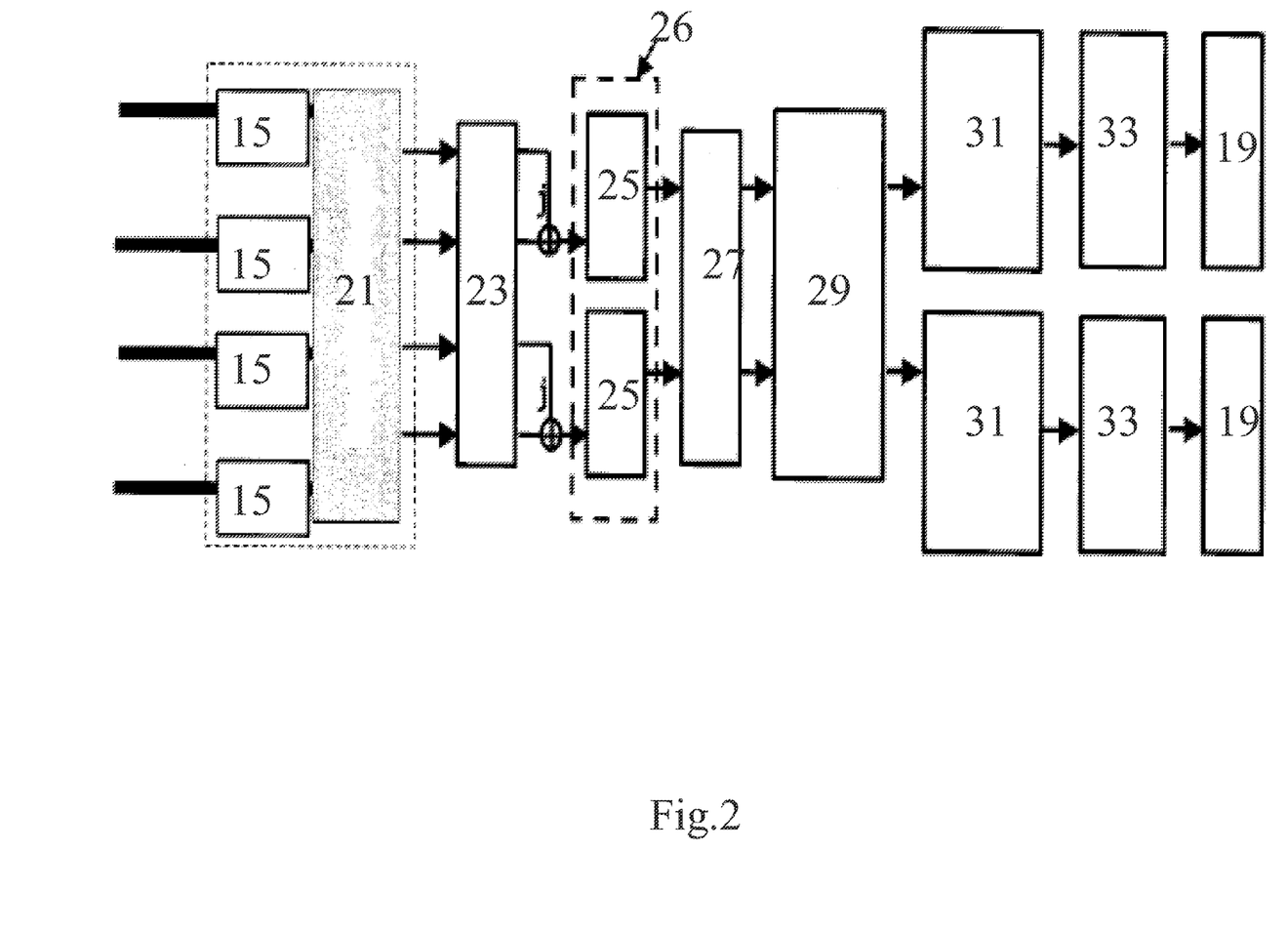
FIG. 2 is a synoptic diagram of different units used in a digital signal processing circuit of an optical coherent receiver.

However, such performances require devices achieving coherent detection of such signals at the egress node. FIG. 1 represents a coherent receiver used in high modulation rate WDM optical networks. Said receiver comprises two combining units 1 allowing to combine an incoming signal 3 which is splitted by a polarization beam splitter 5 with the signal provided by a local oscillator 7. Said combining units 1 comprises λ/4 optical filters 9, half mirrors 11 and polarization beam splitters 5 that allow to obtain four signals that are sent to four different photodiodes 13. The signals coming from the photodiodes 13 are then converted by analog to digital converter (ADC) 15 and transmitted to the digital signal processing unit 17. At the output of the DSP unit 17, signals are transmitted to the bit error rate (BER) decoding unit 19. The details of the digital processing unit 17 are represented in FIG. 2. After conversion in the ADC 15, signals are transmitted to a sampling scope 21 and then to a re-sampling unit 23. After re-sampling, chromatic dispersion units 25 achieve a coarse filtering of the residual chromatic dispersion. A unit 26 may therefore refers to the coarse filtering of the chromatic dispersion. Digital clock recovery is then achieved in the unit 27, then the polarization demultiplexing and equalization unit 29 achieves a fine compensation for the residual chromatic dispersion. Signals are then transmitted to frequency and carrier phase recovery units 31, symbol identification units 33 and are then transmitted to bit error rate decoding units 19. Thus, such equipments allow to process optical signals having high modulation rates.

In order to improve the flexibility of the network, a possible next step is the aggregation of different signals along an optical channel in order to optimize the network capacity.

However, it turns out that the detection devices used in legacy circuit networks, as the one previously described in FIG. 1 and FIG. 2, are not adapted because they are too slow, in particular the step corresponding to the coarse filtering of the residual chromatic dispersion (unit 26) which is based on adaptive methods and which requires the convergence of the method and/or the selection of optimized filtering parameters. In the same way, the devices used for the filtering of the other linear physical impairments such as the polarization mode dispersion are too slow to achieve efficient filtering in the required time range.

SUMMARY OF THE INVENTION

It is therefore an object of the present invention to overcome the above cited drawbacks and provide a method that enables to reduce the time necessary to achieve linear physical impairment compensation filtering such as the residual chromatic dispersion filtering.

Thus, the present invention refers to a method for operating a coherent optical packet receiver comprising at least one linear physical impairment compensation filter wherein the settings of at least one linear physical impairment compensation filter applied on a received optical packet having at least one given travelling parameter are determined in function of previous settings determination of said at least one linear physical impairment compensation filter achieved on at least one optical packet having a similar at least one travelling parameter as said received optical packet.

According to one aspect, the settings of at least one linear physical impairment compensation filter applied on a received optical packet having at least one given travelling parameter are determined in function of previous settings determination of said at least one linear physical impairment compensation filter achieved on at least one optical packet having a same at least one travelling parameter as said received optical packet.

According to another embodiment, the at least one linear physical impairment compensation filter comprises a polarization mode dispersion filter.

According to an additional embodiment, the at least one linear physical impairment compensation filter comprises a chromatic dispersion filter.

According to another embodiment, the filtering of the chromatic dispersion comprises a first and a second stages, said first stage achieving a coarse filtering of said chromatic dispersion and said second stage achieving a fine filtering of said chromatic dispersion and the settings of the chromatic dispersion filter of the first stage applied on a received optical packet having at least one given travelling parameter are determined in function of previous settings determination of said chromatic dispersion filter of the first stage achieved on at least one optical packet having a similar at least one travelling parameter as said received optical packet.

According to a further embodiment, the filtering of the chromatic dispersion comprises a first and a second stages, said first stage achieving a coarse filtering of said chromatic dispersion and said second stage achieving a fine filtering of said chromatic dispersion and the settings of the chromatic dispersion filter of the first stage applied on a received optical packet having at least one given travelling parameter are determined in function of previous settings determination of said chromatic dispersion filter of the second stage achieved on at least one optical packet having a similar at least one travelling parameter as said received optical packet.

According to an additional embodiment, the settings of at least one chromatic dispersion filter corresponding to at least one given travelling parameter are saved in a look-up table.

According to a further embodiment, the look-up table is updated after a predetermined time based on the settings determination of new received optical packets.

According to another embodiment, service optical packets are used for the updating of the look-up table.

According to an additional embodiment, the at least one travelling parameter comprises the lightpath followed by the optical packets.

According to a further embodiment, the at least one travelling parameter comprises the residual chromatic dispersion undergone by the optical packet.

According to another embodiment, the at least one travelling parameter is transmitted in a control optical packet transmitted on a dedicated control channel.

According to a further embodiment, the at least one travelling parameter is transmitted in an optical packet header.

The present invention also refers to a coherent optical receiver comprising at least one linear physical impairment compensation filter adapted to process a received optical packet having at least one given travelling parameter and at least one processing mean being adapted to perform the determination of said at least one travelling parameter and to adapt the settings of said linear physical impairment compensation filter in function of previous settings applied on an optical packet having a similar at least one travelling parameter.

According to another embodiment, the at least one linear physical impairment compensation filter comprises a polarization mode dispersion filter.

According to a further embodiment, the at least one linear physical impairment compensation filter comprises a chromatic dispersion filter.

With respect to another aspect, the previous settings have been applied on an optical packet having an identical at least one travelling parameter.

According to an additional embodiment, the coherent optical receiver comprises means to detect said at least one travelling parameter.

According to a further embodiment, the at least one travelling parameter comprises an identifier of a transparent path followed by the optical packet.

According to another embodiment, the at least one travelling parameter comprises a residual chromatic dispersion quantity undergone by the optical packet.

According to an additional embodiment, the coherent optical receiver comprises a first chromatic dispersion filter achieving coarse filtering and a second chromatic dispersion filter achieving fine chromatic filtering wherein the settings of said first chromatic dispersion filter are determined in function of previous settings applied on an optical packet having a similar at least one travelling parameter.

The present invention also refers to an optical network comprising nodes equipped with coherent optical receivers and processing means adapted to transmit the value of the at least one travelling parameter from one node to another.

According to another embodiment, said nodes comprise processing means adapted to perform the updating of the value of the at least one travelling parameter of an optical packet from its ingress node to the current node.

DETAILED DESCRIPTION OF THE INVENTION

As used herein, the term "travelling parameter of an optical signal" refers to a parameter of said optical signal that varies in function of the path followed. Said travelling parameter may be, for example, an identifier of the travelling path of the optical signal or a parameter which varies depending on the path such as the residual chromatic dispersion.

As used herein, the term "service optical packet" refers to an optical packet which does not comprise any data needing to be transmitted and which is transmitted in order to control the variations of a travelling parameter.

As used herein, the term "lightpath" refers to a transparent path in an optical network.

The present inventions may be embodied in other specific apparatus and/or methods. The described embodiments are to be considered in all respects as only illustrative and not restrictive. In particular, the scope of the invention is indicated by the appended claims rather than by the description and figures herein.

In order to improve the flexibility of the network, a possible step is the aggregation of different signals along an optical channel in order to optimize the network capacity and to use optical packets together with coherent detection devices.

An embodiment of the present invention refers to an optimization of the filter parameters determination for the coarse filtering of the residual chromatic dispersion in a coherent optical receiver. Said optimization corresponding to the saving of the filter parameters obtained for an optical packet having given travelling parameters, said saved filter parameters being reused in case an optical packet having similar, or for example the same travelling parameters is received at the input of the coherent optical receiver.

Indeed, the linear physical impairments such as the polarization mode dispersion or the residual chromatic dispersion are factors that vary in function of the lightpath followed by the packet. Moreover, for a given lightpath the residual impairment such as the residual chromatic dispersion may vary in the course of the time. Thus, a correspondence between the lightpath of an optical packet and its residual impairment (residual chromatic dispersion or residual polarization mode dispersion for example) may be determined but regular updatings may be needed in order to obtain a good adequation.

These updatings may be achieved each time an optical packet that has travelled through a given lightpath, is received or after a predetermined amount of time. In the latter case, if no optical packet is received along a given lightpath after a predetermined time has elapsed, a service optical packet is sent along the path in order to update the value of the residual impairment, such as the chromatic dispersion, along said lightpath. Moreover, service optical packets may be used to initialize a network or a part of a network comprising coherent optical packet receivers at the time of its implementation.

In the following of the description, focus will be made on the case of a chromatic dispersion filtering, nevertheless, similar techniques may be applied on other linear physical impairments.

Figure 3:
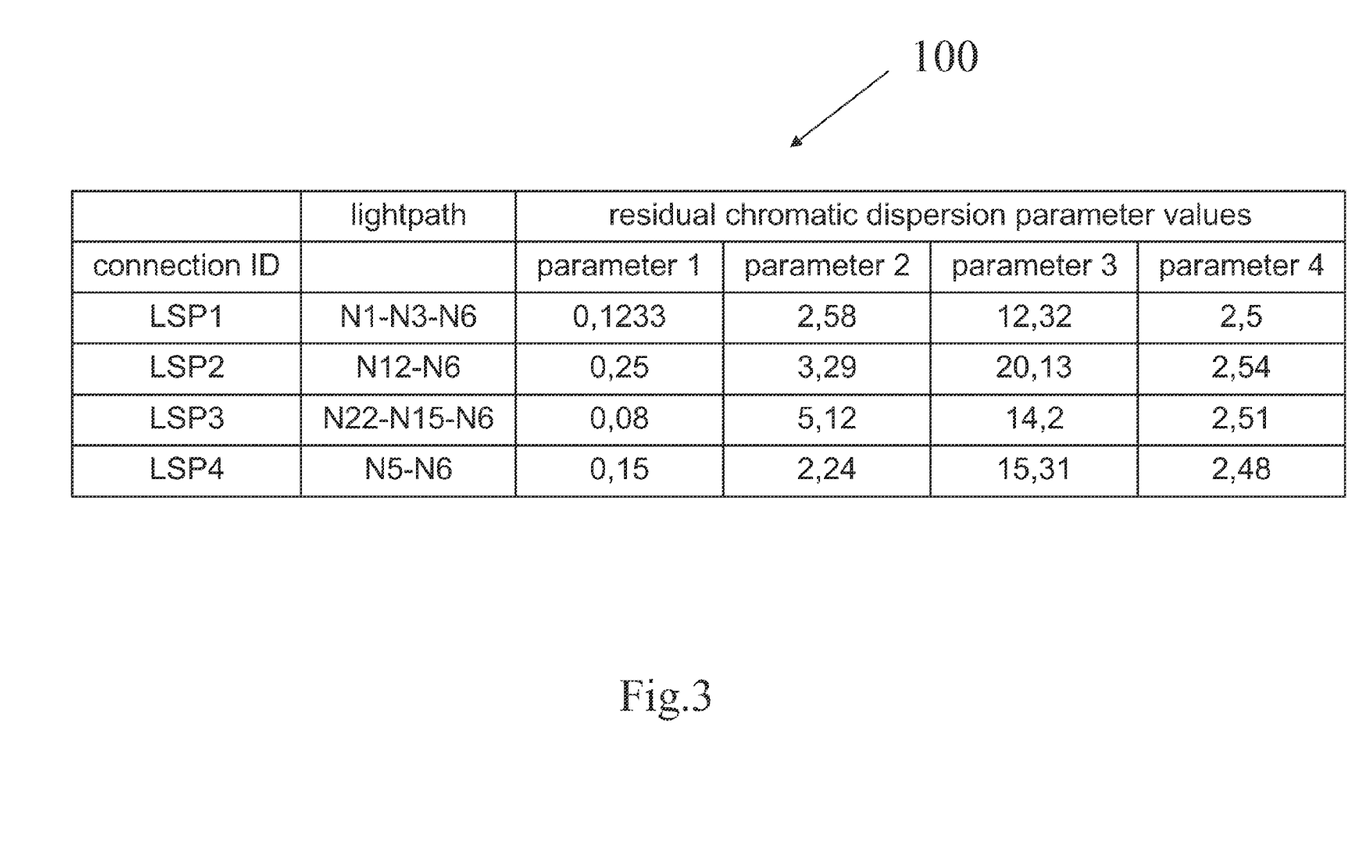
FIG. 3 is a chart representing an example of a part of a look-up table according to an embodiment of the present invention.
Figure 4:
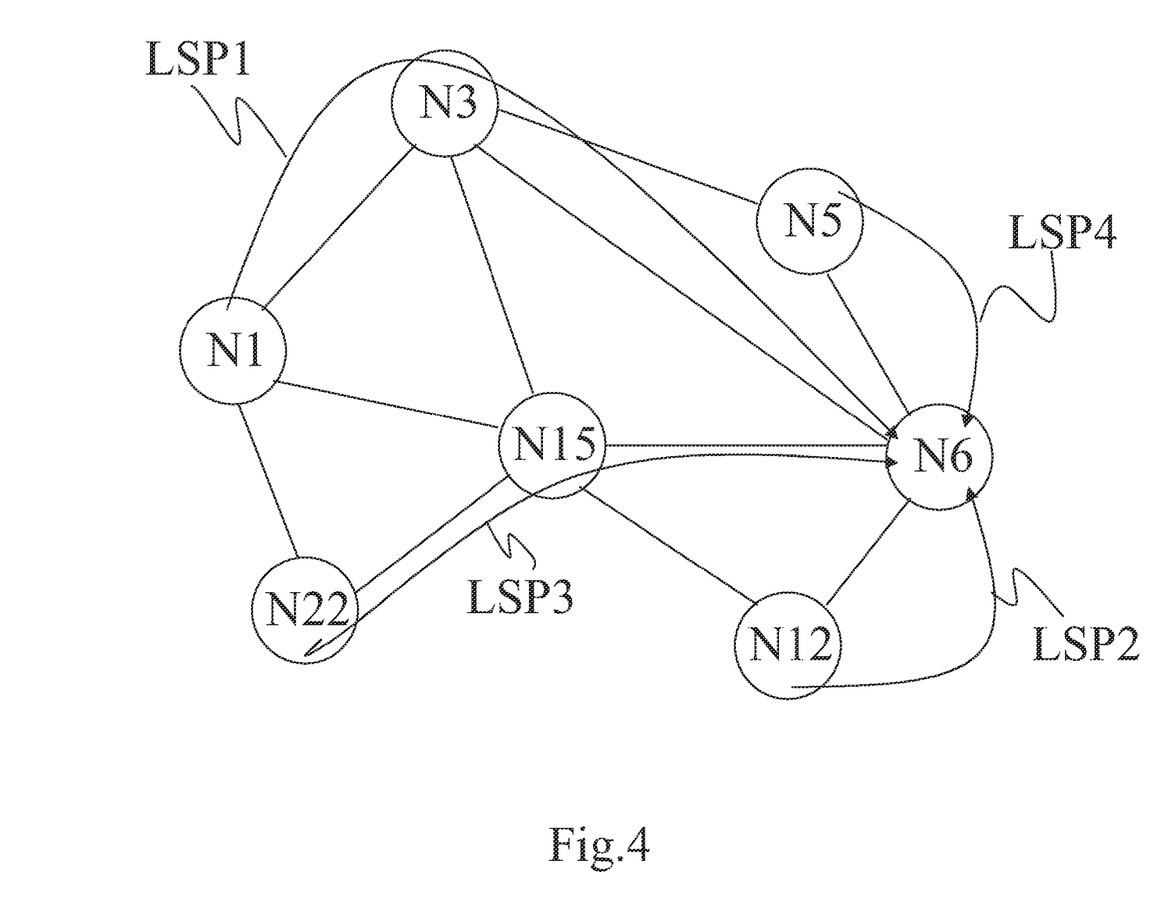
FIG. 4 is a diagrammatic representation of a transparent optical network in which embodiments of the invention can be used.

The values of residual chromatic dispersion compensation filter coefficients and the associated lightpaths are saved in a look-up table 100 such as the one described in FIG. 3. The lightpaths referred to in FIG. 3 are shown on FIG. 4, which represents an optical network. In the present example, the chart corresponds to an example of a part of the look-up table corresponding to the node N6. The second column represents the lightpaths from the ingress node to the egress node (N6) through the intermediate nodes. The other columns comprise the values of the parameters needed for the residual chromatic dispersion filtering method. The number of these parameters may vary in function of the chromatic dispersion filter.

Thus, if an optical packet coming directly from node N12 is received at node N6, the values of the parameters saved in the look-up table (0.25; 3.29; 20.13; 2.54 in the present example) are retrieved from a data storage 44 (see FIG. 5) and loaded into filtering unit 26 to be used as starting filter parameters instead of using random or default parameters. As the filter parameters used have been obtained for an optical packet having a similar lightpath (for example the same lightpath), the convergence of the adaptive filter used for the coarse chromatic dispersion filtering will be much faster.

Nevertheless, as the travelling conditions may have changed since the optical packet which values are saved in the look-up table has been transmitted, the final values obtained for the newly received optical packet may be slightly different (0.26; 3.35; 20.56; 2.39 for example). Said new parameter values are therefore used to update the values corresponding to the lightpath N12-N6 in the look-up table and will be used as starting parameters for the chromatic dispersion filtering method for the subsequent optical packet having the lightpath N12-N6. It has to be noted that the parameters saved in the look-up table may be either the parameters directly obtained in the coarse filtering unit 26 or the parameters obtained in the fine filtering unit 29 (or a conversion of said parameters obtained at unit 29).

In practise, the look-up table may be centralized and may cover the entire network or may be implemented locally in a network node and therefore comprises the lightpaths leading to said node.

In FIG. 3, the first column comprises a connection identifier corresponding to a respective point-to-point photonic connection associated to each lightpath. The photonic connections LSP1 to LSP4 are shown on FIG. 4. In connection-oriented communications, optical packets are transmitted in pre-established connections, e.g. Label-Switched Paths in a GMPLS network. Therefore, in an embodiment, a connection identifier can serve as an identifier for the lightpath followed by the packet. In another embodiment, data packets are transmitted in multipoint to point photonic buses, as described in publication EP-A-1349416. In that case, a lightpath can be identified by a combination of a bus identifier and a source node identifier. Alternatively lightpaths can be identified with other data, e.g. an explicit route object.

Besides, instead of the lightpath, other travelling parameters representative of the residual chromatic dispersion may be used. For example, the distance covered by an optical packet from its ingress node to its egress node, the number of intermediate nodes along the lightpath or the residual chromatic dispersion itself. In such cases, optical packets will be considered as similar if their travelling parameter is comprised in a common predetermined interval representing the maximum acceptable difference for the operator. For example, optical packets having a path length within an interval of distance, for example, two optical packets having a path length comprised within the interval [200-220 km] would be considered as similar.

If the travelling parameter is the chromatic dispersion, the chromatic dispersion of the optical links is determined by measurements on optical packets. The value of the chromatic dispersion corresponding to an optical link is also updated regularly by measurement on the received optical packets (regular or service optical packets). Thus, the value of the residual chromatic dispersion of an optical packet received at its egress node will be the sum of all the chromatic dispersion of the optical links along its lightpath. In the same way as in the lightpath case, a look-up table comprises the values of the parameters of the residual chromatic dispersion filtering method corresponding to a value or an interval of residual chromatic dispersion.

Moreover, in order for the coherent receiver to know the value of the travelling parameter (lightpath, chromatic dispersion, path length . . . ) corresponding to a received optical packet, said value has to be transmitted along with the optical packet.

Several possibilities may be considered to achieve this goal.

Figure 5:
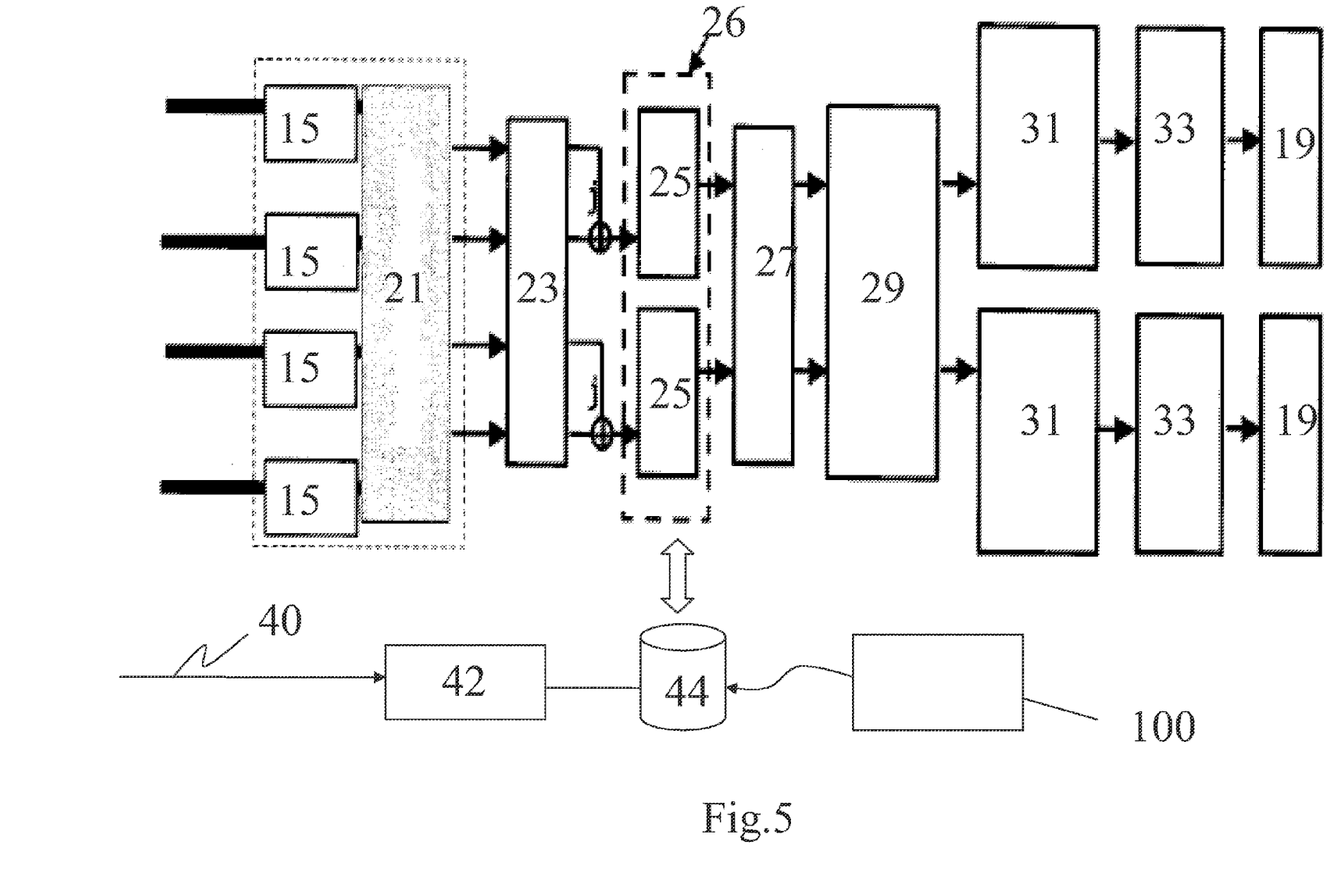
FIG. 5 is a synoptic diagram of different units used in a digital signal processing circuit of an optical coherent receiver according to an embodiment of the present invention.

An embodiment of the present invention is shown in FIG. 5. The same reference numbers as those of FIG. 2 refer to the same units. FIG. 5 differs from FIG. 2 in showing in addition a header/control channel 40 transmitting header/control signals to a travelling parameter value detection unit 42. The detected travelling parameter values can be stored in a data storage 44, for example in form of above mentioned table 100. Data storage 44 is coupled to filtering unit 26.

The value of the travelling parameter can be transmitted in the header of the optical packet. Indeed, a regular optical packet is made up of at least two parts. The first part is called the header and it corresponds to the information necessary for routing and processing the optical packet such as its source node, its destination node, its error correcting code, its size . . . whereas the second part is called the payload and carries the data that the optical packet transmits. Therefore, the travelling parameter may be transmitted in the header.

According to a first shown embodiment, the header and the payload are transported on two different channels. Thus, the information corresponding to the headers of the optical packet is transported in a control optical packet on a dedicated channel called control channel 40.

According to another embodiment, the header and the payload are transported on the same channel one after the other.

In both embodiments, additional information comprising the travelling parameter is carried in the header or the control optical packet. Moreover, other information enabling to improve the processing of the optical packet may be added, such as the modulation format or the modulation rate. Thus, in charging from data repository 44 the travelling parameter associated with the received optical packet, the coherent receiver can therefore determine optimal filter parameters values to apply in the chromatic dispersion filtering method thanks to the look-up table.

Besides, depending on the network features, the value of the travelling parameter at destination may be determined according to two different ways:

According to an embodiment, the entire lightpath of the optical packet is known before transmission and the value of the travelling parameter, e.g. a connection identifier, is determined at the ingress node and is incorporated in the optical packet header (or in the control optical packet) which is then transmitted to the egress node without modifications.

According to another embodiment, the value of said travelling parameter, e.g. cumulated distance or cumulated chromatic dispersion is also carried in the optical packet header (or in the control optical packet) but is computed and updated hop by hop by the equipments of the optical nodes located along the lightpath.

Thus, at the egress node, the coherent receiver can easily retrieve the value of the travelling parameter either from the optical packet header or from the control optical packet depending on the technology used. Then, with the help of the look-up table, parameters values corresponding to optimized chromatic dispersion filtering settings can be determined.

As a conclusion, the features of the embodiments described above allow, thanks to the use of optimized filter parameters as starting filter parameters in the method used in linear physical impairment compensation such as the chromatic dispersion compensation filtering, to improve the convergence speed of said method and therefore to reduce the processing time required for a coherent detection of received signal. The result of such improvement is the possibility to achieve optical packet transmission with high data rates.

The invention claimed is:
1. A coherent optical packet receiver comprising:
at least one linear physical impairment compensation filter; and
a data storage unit coupled to the at least one linear physical impairment compensation filter, the data storage unit being configured to store at least one association between at least one traveling parameter associated with an optical packet and multiple values of parameters for a filter;

wherein settings of the at least one linear physical impairment compensation filter applied on a currently received optical packet comprising the at least one travelling parameter having a value that is computed and updated along a path and depends on the path followed by the currently received optical packet in an optical network and the at least one travelling parameter being carried in a header of the optical packet, are determined as a function of a previous settings determination of the at least one linear physical impairment compensation filter achieved on at least one optical packet previously received and having another at least one travelling parameter of a value which is in a predetermined interval comprising the value of the at least one travelling parameter carried in the currently received optical packet.

2. The coherent optical packet receiver in accordance with claim 1, wherein the at least one linear physical impairment compensation filter comprises a polarization mode dispersion filter.

3. The coherent optical packet receiver in accordance with claim 1, wherein the at least one linear physical impairment compensation filter comprises a chromatic dispersion filter.

4. The coherent optical packet receiver in accordance with claim 1, wherein a value of the at least one travelling parameter is computed and updated hop by hop by equipment of optical nodes located along a path followed by the received optical packet.

5. The coherent optical packet receiver in accordance with claim 1, wherein a value of the at least one travelling parameter is determined at an ingress node and is received without modification in the received optical packet at the coherent optical packet receiver.

6. The coherent optical packet receiver in accordance with claim 1, wherein the previous settings determination is updated for a subsequent optical packet based on travelling conditions of the received optical packet.

7. The coherent optical packet receiver in accordance with claim 1, wherein the at least one linear physical impairment compensation filter processes digital signals.

8. The coherent optical packet receiver in accordance with claim 1, wherein the at least one travelling parameter comprises at least one of an identifier of a transparent path followed by the optical packets, a distance covered by the received optical packet, a number of intermediate nodes along a path, and a residual chromatic dispersion quantity undergone by the received optical packet.

9. The coherent optical packet receiver in accordance with claim 1, wherein the at least one travelling parameter is transmitted in a control optical packet transmitted on a dedicated control channel.

10. The coherent optical packet receiver in accordance with claim 1, wherein the parameters for the filter obtained for the optical packet are saved, and the saved parameters are reused when another optical packet having similar or a same travelling parameter is received.

11. The coherent optical packet receiver in accordance with claim 3, wherein the filtering of the chromatic dispersion comprises a first stage and a second stage, the first stage being configured to achieve a coarse filtering of the chromatic dispersion and the second stage being configured to achieve a fine filtering of the chromatic dispersion, and wherein the settings of the chromatic dispersion filter of the first stage applied on the received optical packet having the at least one travelling parameter are determined as a function of the previous settings determination of the chromatic dispersion filter of the first stage achieved on the at least one optical packet having a similar at least one travelling parameter as the received optical packet.

12. The coherent optical packet receiver in accordance with claim 3, wherein the filtering of the chromatic dispersion comprises a first stage and a second stage, the first stage being configured to achieve a coarse filtering of the chromatic dispersion and the second stage being configured to achieve a fine filtering of the chromatic dispersion, and wherein the settings of the chromatic dispersion filter of the first stage applied on the received optical packet having the at least one travelling parameter are determined as a function of the previous settings determination of the chromatic dispersion filter of the second stage achieved on the at least one optical packet having a similar at least one travelling parameter as the received optical packet.

13. The coherent optical packet receiver in accordance with claim 3, wherein the settings of at least one chromatic dispersion filter corresponding to the at least one travelling parameter are saved in a look-up table of the data storage unit.

14. The coherent optical packet receiver in accordance with claim 3, wherein the at least one travelling parameter comprises a residual chromatic dispersion quantity undergone by the optical packet.

15. The coherent optical packet receiver in accordance with claim 11, wherein the first stage comprises two filters that perform the coarse filtering of the chromatic dispersion.

16. The coherent optical packet receiver in accordance with claim 13, wherein the look-up table is updated after a predetermined time based on the settings determination of new received optical packets.

17. The coherent optical packet receiver in accordance with claim 16, wherein service optical packets are used to update the look-up table.

18. A coherent optical receiver comprising:
at least one linear physical impairment compensation filter adapted to process a currently received optical packet that has at least one travelling parameter carried in a header of the optical packet and having a value that is computed and updated along a path and depends on the path followed by the currently received optical packet;
at least one processing mean being adapted to perform the determination of a value of the at least one travelling parameter and to adapt the settings of the linear physical impairment compensation filter as a function of previous settings applied on an optical packet previously received and having another at least one travelling parameter of a value which is in a predetermined interval comprising the value of the at least one travelling parameter carried in the currently received optical packet; and
a data storage unit coupled to the at least one linear physical impairment compensation filter, the data storage unit being configured to store at least one association between the at least one traveling parameter associated with an optical packet and multiple values of parameters for a filter.

19. A coherent optical receiver in accordance with claim 18 further comprising a detection means configured to detect the at least one travelling parameter.

20. An optical network comprising:
an egress node equipped with the coherent optical receiver in accordance with claim 18;
an ingress node adapted to transmit an optical packet and an associated travelling parameter towards the egress node; and at least one intermediate node adapted to forward transparently the optical packet towards the egress node, wherein each of the at least one intermediate node comprises processing means adapted to perform an update of a value of the associated travelling parameter of the optical packet.

\* \* \* \* \*